United States Patent [19] [11] 4,099,052
McKinney [45] Jul. 4, 1978

[54] MASS SPECTROMETER BEAM MONITOR

[75] Inventor: Charles R. McKinney, Monrovia, Calif.

[73] Assignee: E. I. Du Pont de Nemours and Company, Wilmington, Del.

[21] Appl. No.: 748,298

[22] Filed: Dec. 7, 1976

[51] Int. Cl.² ............ B01D 59/44

[52] U.S. Cl. ............ 250/283; 250/286; 250/492 B

[58] Field of Search ............ 250/283, 286, 492 R, 250/492 B

[56] References Cited

U.S. PATENT DOCUMENTS

| | | | |
|---|---|---|---|
| 3,546,449 | 12/1970 | Aspinal | 250/288 |
| 3,548,188 | 12/1970 | Nemeth | 250/286 |
| 3,602,709 | 8/1971 | Hull | 250/286 |

*Primary Examiner*—Harold A. Dixon

[57] ABSTRACT

The ion beam from a field desorption source in a double focusing magnetic mass spectrometer is monitored by disabling the electric sector of the mass analyzer such that the ion beam is not deflected. An opening is provided in the wall of the electric sector such that the undeflected ion beam may pass therethrough to a detector. This permits the characteristics of the field desorption source to be ascertained more quickly and easily so that a mass analysis may be performed. The monitor may be operated automatically to vary a characteristic of the field desorption source until ions are detected. Thereafter, the electric sector is energized and an analysis performed.

11 Claims, 3 Drawing Figures

MASS SPECTROMETER BEAM MONITOR

BACKGROUND OF THE INVENTION

This invention relates to mass spectrometers and, more particularly, to an ion beam monitor that facilitates the use of mass spectrometers.

Mass spectrometers are well known for their use in analyzing unknown samples by observing their mass spectra. To observe such mass spectra the unknown sample is first converted into an ion beam which is mass analyzed in a well-known manner. Various high energy and low energy sources are used to provide ions of the unknown sample.

In contrast to electron impact mass spectrometry (a high energy source), field desorption sources produce relatively uncomplicated mass spectra that characterize the molecular weight of various materials. The technique known as field desorption mass spectrometry has come into extensive use in the last few years, particularly for the analysis of organic compounds. Field desorption mass spectrometry utilizes stable field desorption emitters having long dendrites capable of adsorbing sufficient sample to provide useful field desorption spectra. Such field desorption emitters are described by H. D. Beckey et al., *J. Physics E.; Scientific Instruments*, 6, 1043 (1973).

A field desorption ion source of conventional design produces positive ions of the sample applied to the emitter. Such ions are produced when the emitter is heated in an electric field of sufficient strength, usually $10^7$ volts/centimeter, to remove an electron from the sample molecule, Such removal normally occurs at one of the many tips of the dendrites on the emitter. These ions are produced from the sample that is applied to the emitter when and if two conditions are simultaneously achieved. The first is that the sample remains on the emitter as the emitter is heated. Secondly, proper for ionization of the sample must exist within the temperature and electric field characteristics of the source.

In the analysis of unknown materials, neither of these conditions are known. When these uncertainties are added to the fact that the ions to be expected in the analysis are not known and the operational difficulties associated with field desorption analyses, it is imperative that the operator know when ions are being produced from the sample, irrespective of mass analysis. It would be highly desirable if one were able to first learn the field desorption characteristics of the sample and then perform the mass analysis. This would result in a great reduction of the time required.

SUMMARY OF THE INVENTION

Accordingly it is an object of this invention to provide an improved apparatus for determining the field desorption characteristics of a sample.

Another object of this invention is to provide an improved system for effecting field desorption analyses of samples.

A conventional ion beam analyzer includes a sample ion source for generating ions of a sample to be analyzed, means for extracting the sample ions from the source, means for focusing the extracted sample ions into a beam, separation means positioned along the ion beam for selectively deflecting species of ions, and detecting means for detecting the selected species ions.

According to this invention, disabling means are added to the beam analyzer for disabling at least a portion of the separation means such that the ion beam from the ion source remains undeflected. Sensing means are located along the undeflected ion beam for sensing the sample ions when they do occur, and, finally, enabling means are coupled to the disabling means for reenabling the mass separation means. This permits the operator to vary such features as source (emitter) position, temperature and electric field strength until ions are produced from the unknown sample. This permits a ready determination of the field desorption characteristics of the sample, i.e., when the sample is producing ions. Once these characteristics are acquired, the operator may readily reproduce such characteristics or select those characteristics which are deemed most desirable for the particular analysis to be performed.

The various emitter characteristics may be varied automatically or manually; for example, the emitter current (and hence emitter temperature) may respond to the sensing means for automatically reenabling the mass separation means when the sample ions reach a predetermined intensity level. Automatic means may be used to vary the field desorption characteristics until ions are produced. At this point, a mass analysis is performed following which the field desorption characteristics may be further varied. One of the most easily automated of these field desorption characteristics is that of emitter temperature.

DESCRIPTION OF THE DRAWINGS

Further advantages and features of this invention will become apparent upon consideration of the following description wherein.

DETAILED DESCRIPTION OF THE PREFERRED EMBODIMENTS

Figure 1:
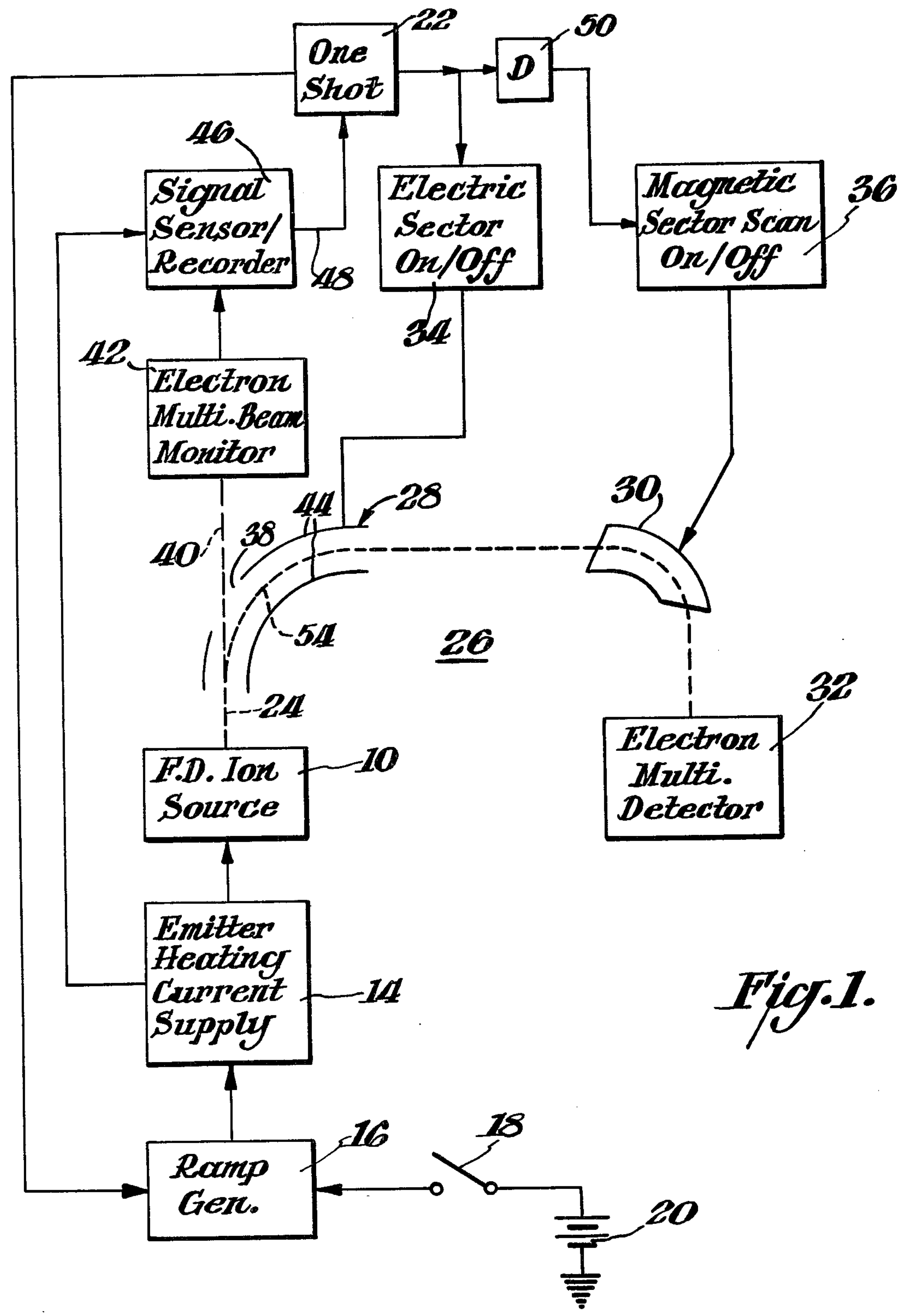
FIG. 1 is a part diagrammatic and part block representation of an automated analyzer system contructed in accordance with a preferred embodiment of this invention.

The overall system of this invention is depicted in the representation of FIG. 1. While this invention may find use with a mass analyzer using any low energy ion source such as chemical ionization or photo ionization, it will be described in conjunction with the preferred usage which is with a field desorption source. Field desorption sources are known and are described, for example, in the said Beckey article. Such a source is depicted in FIG. 1 by the block 10. This field desorption source includes an emitter 12 (FIG. 2) as will be described hereinafter. This emitter 12 has an emitter heating current supply 14 which may be controlled manually or, in a preferred embodiment, by a ramp generator 16. The ramp generator may be any well-known generator capable of generating an increasing current as a function of time such as provided by a power supply whose output is controlled by the charging of a capacitor. Function generators of this type are described, for example, in Chapter 7 of "IC OP-AMP Cookbook" by Walter G. Jung, copyright 1974 by Howard W. Sams & Co., Inc., Indianapolis, Indiana. The ramp generator may be energized by a manual switch 18 connected to a source of potential depicted by the battery 20. The ramp function generated by the generator 16 may be temporarily terminated or delayed, as will be described in conjunction with FIG. 3, by an output signal, which disables the generator, from a one-shot multivibrator 22 of predetermined time duration as determined by the output characteristic of the one shot. The one-shot multivibrator 22 may be any conventional circuit.

Ions, generated by the ion source, are depicted by the dashed line 24 as passing through a separation means 26 which, in the preferred embodiment, includes an electric sector 28 and a magnetic sector 30, both of well-known design. An instrument incorporating such features, including the ion source 10 and an electron multiplier type detector 32 at the output of the magnetic sector 30 is available from the E. I. du Pont de Nemours and Company, Wilmington, Delaware. Such instrument is sold as a Model 21-492B. The ions of beam 24 are deflected in the electric sector 28 by an electrostatic field therein established by an electric potential derived from an appropriate source depicted by the block 34. In like manner the magnetic sector 30 is controlled by a magnetic sector power supply depicted by the block 36.

As is known, the ions leave the source 10 and are deflected in the electric sector by the electrostatic field therein and then by the magnetic field of magnetic sector according to their respective mass to charge ratios. The separated ions, thus separated by the separation means 26, are detected by the electron multiplier detector 32.

In accordance with this invention, an opening or a hole 38 is provided in the outside of one of the walls or field plates 44 of the electric sector 28, as will be described hereinafter in conjunction with FIG. 2, so that an undeflected beam of ions 40 may pass to an electron multiplier beam monitor detector 42. To permit this undeflected path of ions to occur, the field plates 44 of the electric sector 28 are shorted together such that no deflecting field exist. Under these conditions the ions proceed along a straight line path as depicted by the dashed line 40. The ions thus leave the electric sector 28 and pass to the beam monitor 42.

The electron multiplier beam monitor 42 consists of a secondary electron multiplier (SEM), being any one of several commercially available types. The anode (not shown) of the beam monitor is connected to the input of a solid state amplifier. In the preferred embodiment, the beam monitor 42 is identical with the electron multiplier detector 32. As is well known to those experienced in the practice of mass spectrometry, the sensitivity and most particularly the signal to noise ratio of the secondary electron multiplier plus solid state amplifier is superior to that of a conventional electrometer amplifier. Mass spectrometers previously used for field desorption analysis, such as described by Beckey hereinabove mentioned or many of those commercially available, have been limited in their ability to perform field desorption analyses due to the low sensitivity and high noise level of an electrometer type beam monitor. Such prior art beam monitors have typically been positioned adjacent the ion source. Electron multipliers cannot be so located.

An electron multiplier is particularly advantageous in this application due to the very low intensity of ions produced by the field desorption ion source 10. As has been reported by Beckey, most organic samples that are analyzed by the field desorption technique are typically very involatile and subject to thermal decomposition. Both of these characteristics result in low intensity ion beams (typically $10^{-18}$ to $10^{-14}$ amperes) being produced. A secondary electron multiplier detector can easily detect such low intensity signals whereas an electrometer detector cannot.

The output of the beam monitor 42 is connected to a conventional detector, which in this one embodiment, is depicted as a conventional chart recorder 46. This recorder may have either an electronic microswitch or photo beam detector for sensing the pen position such that when a predetermined, selectable amplitude of the ion beam 40 is detected by the beam monitor 42, an output signal may be generated on line 48. This output signal is connected to trigger the one-shot multivibrator 22 and also is connected though a time delay network 50 to the magnetic sector scan control 36. The output signal is also connected directly to the electric sector on-off control 34.

While it is to be noted that the system may be operated with manual controls, including that of the ramp generator 16 (i.e., a potentiometer may be adjusted to vary the heater current), the automatic system depicted in FIG. 1 is preferred.

Thus in a typical operation an unknown sample to be analyzing using a field desorption ion source is placed upon the emitter of the source 10 in a conventional manner. Next, the ramp generator 16 is turned on by closing the switch 18. This causes the emitter heating current, as depicted in the timing waveform of FIG. 3, to increase (in this case, linearly) as a function of time. The electric sector and magnetic sector scan circuits 34 and 36, respectively, are off; i.e., plates 44 of the electric sector 28 are shorted together such that a zero voltage differential is applied thereacross and there is no electric field to cause deflection of the ion beam 24. Similarly, the current supplied to the magnetic sector deflection coils is constant, i.e., no scansion takes place.

Figure 3:
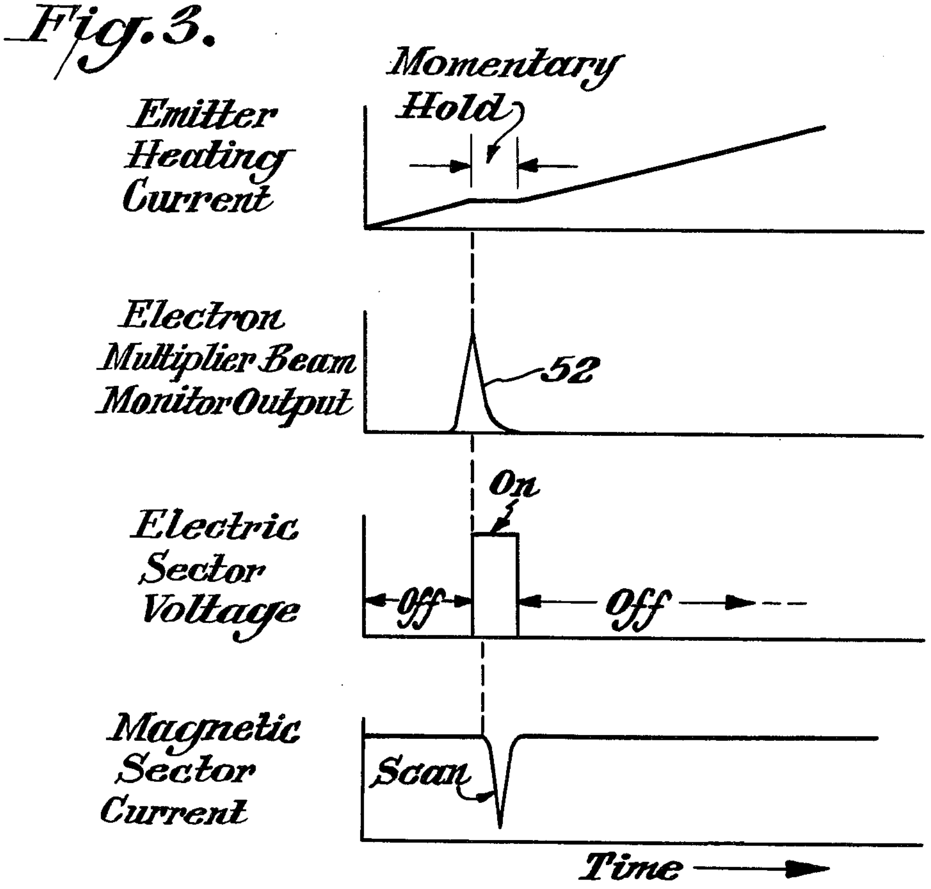
FIG. 3 is a timing diagram of emitter heating current, beam monitor output, electric sector voltage and magnetic sector current for a particular operative embodiment of a system utilizing this invention.

Under these conditions any ions produced in the ion source 10 irrespective of energy and mass are all directed by the accelerating potential in the source along the straight line path 40 to the beam monitor 42. When a particular emitter temperature, due to the emitter heating current, is achieved (a field desorption characteristic of the sample), it will produce ions from the particular sample under investigation. These ions are detected by the beam monitor 42 producing a typical output signal as depicted by the waveform 52. When this signal reaches a predetermined level, the level is sensed by the sensor in the recorder 46. The sensor provides a trigger signal to the one-shot multivibrator 22 whose output activates the electric sector supply 34, temporarily discontinues the ramp so that a momentary hold is placed on the emitter heating current for the period of the one-shot pulse, and activates a scansion by the magnetic sector scan 36 after a slight delay provided by the delay 30. The ion beam 24 is deflected along the curved path 54 by the electric sector. A short time later, after any instability of the system has had a chance to stabilize, the magnetic sector supply 36 effects a scansion, as depicted in FIG. 3 by the magnetic sector current waveform, to complete the deflection of the ions to be detected by the detector 32 of the mass analyzer. Once the one-shot multivibrator pulse is terminated, both the electric sector and magnetic are returned to their "off" condition and the emitter heating current allowed to continue its rise. Perhaps another temperature will be reached at which ions occur, perhaps not; it depends on the field desorption characteristics of the sample. The pulse from the one-shot 22, is of sufficient duration to permit a complete scansion of the magnetic sector.

Other field desorption characteristics of the sample include emitter position and electric field within the ion source. These may also be varied either manually or automatically. For example, the electric field may be varied by known means, such as by a potentiometer, or by variation of the voltage of the various supplies depicted in FIG. 2. In this latter event, the one-shot multivibrator instead of being connected to the ramp generator for the emitter heating current supply, will be connected to a similar ramp generator (not shown) for a voltage controlled power supply such as the positive potential supply 60 or the negative potential supply 62.

In conventional field desorption apparatus, some samples fail to be ionized. The system of this invention will permit this determination in one or two loadings of a sample. In contrast the field desorption sources of the prior art require many loadings and even then one cannot always be certain whether ions are produced or not. If a manual system is used, the recorder will still be preferably used so that the characteristic point at which ions occur will be recorded for future reference. Alternate automatic modes of operation are also possible; for example, heater current and field strength in the source may be varied simultaneously.

Figure 2:
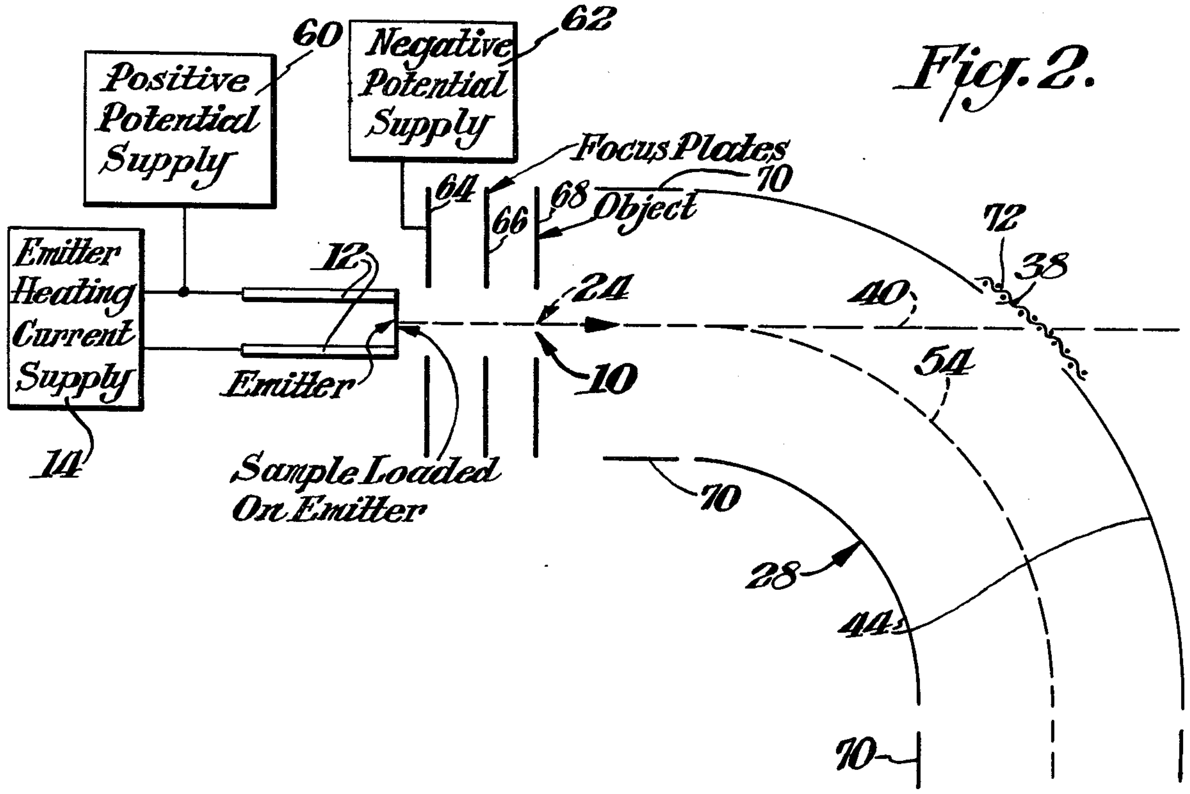
FIG. 2 is a part diagrammatic and part block representation of the mass analyzer of FIG. 1 depicting a field desorption emitter and a particular placement of a detector for the ion beam.

Some of the elements of the system illustrated in FIG. 1 are shown in greater detail in FIG. 2. Thus the ion source 10 is shown to include a field desorption emitter 12 of conventional design connected to the emitter heating current supply 14. A positive potential supply 60 is connected to the emitter 12. Accelerating electrodes 64 are connected to a negative potential supply 62 to accelerate positive ions from the emitter 12, the positive ions being depicted by the path 24. A focus plate 66 and an object slit 68 of conventional design are also employed to ensure appropriate direction of the ion beam along its path 24 to the electric sector 28. This electric sector has terminator plates 70 at either end which are of conventional design. The sector plates 44 themselves, in a typical case, may be constructed such that the inner plate is on a 7.54 centimeter radius and the outer plate is on a 17.02 centimeter radius. At the point where the undeflected ion beam 40 would intercept the outer plate 44, an orifice or hole 38 is formed in the outer sector plate and a wire grid 72 is placed over this opening to maintain the uniformity of the electric field within the electric sector 28. These wire grids, in a typical example, may be one mil platinum wire with a 32 mil on center spacing. The wires making up the grid are attached and electrically connected to the outer sector plate 44.

While this system has been described with reference to placing the orifice within the electric sector it may also be appropriately placed in other systems. For example, certain mass spectrometer designs exist wherein the magnetic and electric sectors are transposed placing the magnetic sector first or there may only be a magnetic sector. In either case, a means can be provided to cause the magnetic field to be set to zero thus allowing the ion beam to pass undeflected into an electron multiplier beam monitor as herein described. The means of setting the magnetic field to a zero level can be through the use of the well-known Hall-effect detector coupled to a feed-back circuit of conventional design that would cause the magnetic power supply to be set at such a level that achieves a zero magnetic field. A hole similar to that formed in the electric sector is formed in the magnetic sector. In this instance, no grid is necessary to maintain the uniformity of the magnetic field.

There has thus been described a relatively simple system whereby the undeflected ion beam is monitored to ascertain the presence of ions and at that time the system is switched on to perform a mass analysis. This permits, particularly in a field desorption ion source, a variation of the parameters within the ion source such as emitter temperature and field strength in order to determine the particular field desorption characteristics of a sample.

I claim:

1. In an ion beam analyzer having an ion source for generating ions of a sample to be analyzed, means for extracting said sample ions from said source, means for focusing the extracted sample ions into a beam, separation means positioned along the ion beam for selectively deflecting species of ions, and detecting means for detecting the selected species ions, the improvement comprising:

- disabling means for disabling at least a portion of said separation means such that said ion beam from said source remains undeflected,
- sensing means located along the undeflected ion beam for sensing said sample ions, and
- enabling means coupled to said disabling means for reenabling said separation means.

2. The analyzer set forth in claim 1 wherein said enabling means is responsive to said sensing means for automatically reenabling said separation means when said sample ions reach a predetermined intensity level.

3. The analyzer set forth in claim 2 wherein said separation means includes an electric sector followed by a magnetic sector, and said enabling means delays the scanning of said magnetic sector until said electric sector has stabilized.

4. The analyzer set forth in claim 1 wherein said separation means includes an electric sector followed by a magnetic sector, and said enabling means delays the scanning of said magnetic sector until said electric sector has stabilized.

5. The analyzer set forth in claim 1 which includes means responsive to said sensing means for varying a charactertistic of said sample ion source until ions are sensed.

6. The analyzer set forth in claim 5 which includes delay means responsive to said sensing means for further varying said characteristic after a predetermined period of time.

7. The analyzer set forth in claim 5 wherein said ion source is a field desorption emitter and said characteristic is emitter temperature.

8. The analyzer set forth in claim 1 wherein said separation means includes an electric sector followed by a magnetic sector, said electric sector defining a hole in the path of said undeflected ion beam, and said sensing means is located contiguous said hole outisde said electric sector.

9. A method of ascertaining the field desorption characteristics that produce ions from a sample in a field desorption ion source of an ion beam analyzer having ion separation means comprising the steps of:

- energizing said ion source,
- disabling at least a portion of the separation means to prevent deflection of sample ions from said ion source, varying the field desorption characteristics of said source, and detecting said undeflected sample ions to ascertain those field desorption characteristics of said source that produce ions.

10. A method according to claim 9 wherein the additional step of recording the field desorption characteristics at which said sample ions are detected.

11. A method according to claim 9 wherein the field desorption characteristic varied is sample temperature or field strength to which the sample is subjected.

* * * * *